No. 715,356. Patented Dec. 9, 1902.
J. A. DE VITO.
FLEXIBLE SHAFT.
(Application filed Oct. 27, 1902.)
(No Model.)
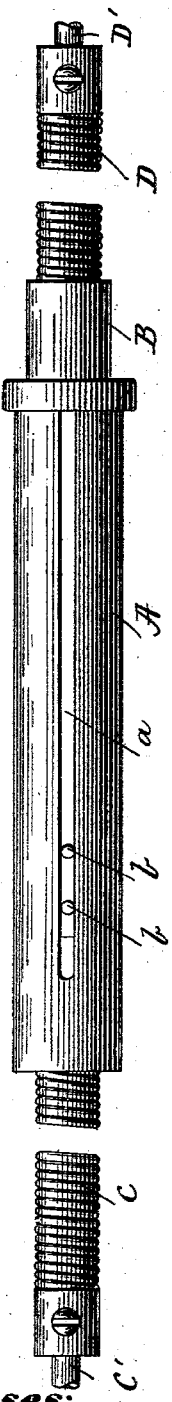
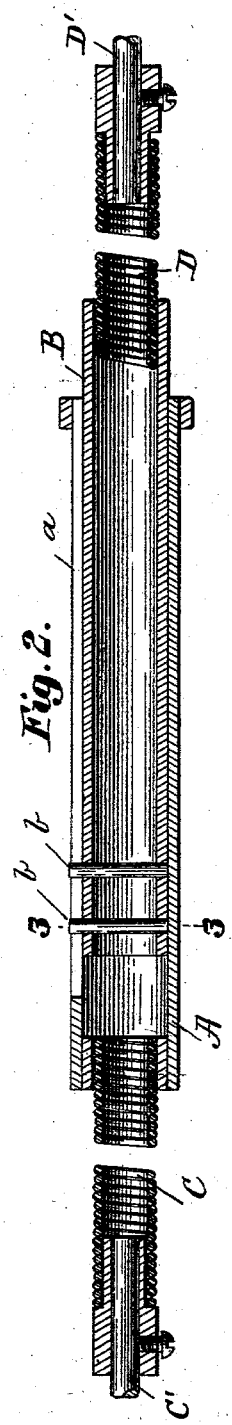
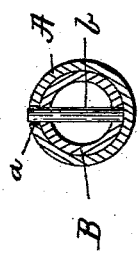
Witnesses:
Walter E. Lombard
Nathan C. Lombard 2nd
Inventor:
John A. De Vito,
by
Atty.

UNITED STATES PATENT OFFICE.

JOHN A. DE VITO, OF BOSTON, MASSACHUSETTS.

FLEXIBLE SHAFT.

SPECIFICATION forming part of Letters Patent No. 715,356, dated December 9, 1902.

Application filed October 27, 1902. Serial No. 128,866. (No model.)

*To all whom it may concern:*

Be it known that I, JOHN A. DE VITO, a citizen of the United States, and a resident of Boston, in the county of Suffolk and State of Massachusetts, have invented certain new and useful Improvements in Flexible Shafts, of which the following is a specification.

This invention relates to improvements in a flexible shaft capable of being bent to any desired angle or curvature and longitudinally adjustable during its rotation for the purpose of imparting a rotary motion to a movable or adjustable tool or object from a rotary shaft. Such a flexible and longitudinally-adjustable shaft may to advantage be employed for imparting a rotary motion from a driver-shaft to drills, polishing-wheels, buffing-tools, boot-blacking brushes, &c., or otherwise, as may be desired.

The invention is carried out as follows, reference being had to the accompanying drawings, wherein—

Figure 1 is a side elevation. Fig. 2 is a central longitudinal section, partly shown in elevation; and Fig. 3 is cross-section on the line 3 3, shown in Figs. 1 and 2.

Similar letters refer to similar parts wherever they occur on the different parts of the drawings.

My improved flexible and longitudinally-adjustable shaft is composed of a pair of telescopic tubes A B, one fitting and sliding within the other. The outer tube A is provided with a longitudinal slit a, adapted to receive guide pins or projections b b, secured to the inner tube B, as shown in the drawings, and by this arrangement said telescopic tubes may be longitudinally adjustable and guided one relative to the other and caused to rotate together when a rotary motion is imparted to one of said members. To the ends of the tubes A B are secured, respectively, the flexible coiled-wire springs C D, as shown.

C' is a shaft or spindle secured to the outer end of the coiled-wire spring C, and D' is a similar shaft or spindle secured to the outer end of the coiled-wire spring D, as shown.

Either end of the above-described flexible and longitudinally-adjustable shaft may be attached to a rotary driver-shaft, and to the other end of such flexible shaft is to be attached the tool or device to which rotary motion is to be imparted from the driver-shaft.

It will be noticed that the said flexible shaft may be bent to any desired angle or curvature and adjusted longitudinally during its rotation, according to the position in which tool, &c., upon the end of the shaft is to be used during its operation.

What I wish to secure by Letters Patent and claim is—

1. The herein-described flexible and longitudinally-adjustable shaft, consisting in combination, a pair of telescopic tubes A, B, one sliding within the other, one of said tubes being longitudinally slitted and the other having pins or projections guided in said slit and flexible coiled-wire springs secured to the outer ends of said adjustable tubes, substantially as and for the purpose set forth.

2. A flexible and longitudinally-adjustable shaft, consisting of two tubular members, one fitting within and guided longitudinally relative to the other member, combined with a flexible coiled-wire spring attached to the outer end of each member substantially as and for the purpose set forth.

In testimony whereof I have affixed my signature in presence of two witnesses.

JOHN A. DE VITO.

Witnesses:
ALBAN ANDRÉN,
CHARLES H. SMITH.